United States Patent [19]

Viaud

[11] 4,402,259

[45] Sep. 6, 1983

[54] BINDING DEVICE FOR CYLINDRICAL BALE FORMING BALER

[75] Inventor: Jean Viaud, Gray, France

[73] Assignee: Deere & Company, Moline, Ill.

[21] Appl. No.: 294,650

[22] Filed: Aug. 20, 1981

[30] Foreign Application Priority Data

Aug. 20, 1980 [FR] France .................................. 80 18201

[51] Int. Cl.³ .............................................. B65B 13/18
[52] U.S. Cl. ............................................ 100/5; 100/88
[58] Field of Search ................... 100/5, 13, 88; 56/341

[56] References Cited

U.S. PATENT DOCUMENTS

| 4,092,818 | 6/1978 | Brewster | 56/341 |
| 4,121,513 | 10/1978 | Kopaska | 100/88 |
| 4,133,258 | 1/1979 | Popiolek | 100/5 |
| 4,205,513 | 6/1980 | Shokoples | 100/5 X |

FOREIGN PATENT DOCUMENTS 2800800  7/1979  Fed. Rep. of Germany ........ 56/341
2336784  of 0000  France .

Primary Examiner—Billy J. Wilhite

[57] ABSTRACT

A baler is comprised of a plurality of rollers and two sets of belts supported on the roller and defining a bale-forming chamber for rolling crop material into a cylindrical bale. A guide is mounted on the exterior of the bale-forming chamber and generally parallel to its longitudinal axis. A control wheel is mounted on a support means for mounting the wheel on the guide for movement about an axis perpendicular to the longitudinal axis of the chamber. By movement of the guide, the control wheel may be moved into and out of contact with one set of the belts. The support further carries a twine guide for guiding the entry of twine into the bale-forming chamber during movement of the support to and fro along the transverse guide. The movement of the wheel about the axis perpendicular to the longitudinal axis of the chamber controls the direction of displacement of the support along the guide when the control wheel is engaged with the set of belts.

11 Claims, 6 Drawing Figures

BINDING DEVICE FOR CYLINDRICAL BALE FORMING BALER

BACKGROUND OF THE INVENTION

The present invention concerns cylindrical-bale-forming balers and more particularly a binding device for bales formed by the baler.

These balers are of a well-known general type and comprise sets of bands or belts which, by their displacement, form, by rolling up inside a baling chamber formed by the belts within the body of the baler, a bale of generally cylindrical shape from harvested products, particularly forage or hay, collected on the ground during the advance of the baler.

The bale is usually bound with twine prior to discharge. This operation, is effected in a known manner by means of a device comprising a twine guide which is disposed transversely of the direction of travel of the baler, generally in front of the entry for harvested products into the baling chamber. The twine is taken from a suitable supply and passed through the guide before entering the baling chamber. When the end thereof arrives within the chamber entry, it engages the outer layer of the bale within the baling chamber and is wound around the bale as it is rotated between the bands or belts. During winding, of the turns of twine so formed are distributed over the length of the bale due to the transverse movement of the guide.

The existing guiding devices are in many cases relatively complicated and consequently their cost of manufacture is high.

Accordingly, an object of the invention is to provide a device for effecting the transverse displacement of the twine-guide with respect to the baler which has a simple and sturdy construction and at the same is time reliable in operation.

SUMMARY OF THE INVENTION

The invention is embodied in a binding device for cylindrical-bale-forming balers of the type comprising sets of members such as, chains, bands or belts which form a chamber for rolling up harvested products for the formation of a cylindrical bale, characterized in that a control wheel is provided which is movable into contact with one of the sets of belts and is movable transversely of the baler along a transverse guide disposed generally between the sets of belts. The wheel is mounted on a support and is movable thereon relative to the longitudinal axis of the baler to cause, by contact with the belts of said one of the sets, a displacement of the wheel support back and forth along the transverse guide. Also means are provided on the said support for receiving and guiding the twine for the binding of the bale. The support of the control wheel is preferably slidably mounted on the transverse guide for example by a linear guide means with ball bearings or by analogous means, in order to be able to travel to and fro transversely of the baler.

According to a possible embodiment, the guide wheel is rotatably mounted within a cover which is pivotable about a substantially vertical axis in a bracket slidably mounted on the guide-forming transverse bar. This mounting thus permits the orientation of the control wheel and consequently the control of its transverse displacement along the guide with respect to the baler. The rate of transverse displacement is a function of the angle formed between the median plane of this control wheel and the longitudinal direction of the baler.

The control wheel is maintained in one or other of two possible positions of orientation, which are preferably defined by stops, by a tension spring which is connected between a member fixed to the cover carrying this guide wheel and a fixed point of the wheel support.

The change in the orientation of the control wheel with respect to the longitudinal direction of the baler at the end of its transverse travel may be brought about in any desired manner.

According to a particularly simple and advantageous embodiment, an arm connected to the control wheel serves as a point of attachment for a cord which extends forwardly, passing through a guide located on the median longitudinal axis of the baler. To shift the wheel and reverse the direction of movement of the wheel along the transverse guide when the wheel has reached one side of the baler, the cord can be operated by the driver of the tractor to which the baler is coupled. Nevertheless, it will be understood that other means, such as simple stops, may be provided for this control operation.

According to one feature of the invention, the control wheel is operatively connected with a wheel, pulley or other pressure member to hold the twine in position between the binding operations. The binding twine is extended between this wheel and this pulley. The control wheel is provided with a mechanism for permitting rotation thereof only in a direction corresponding to the entry of the twine into the baler.

According to another feature, the control wheel is mounted so that it can be raised, in such a manner as not to be brought into contact with the bale-forming belts or bands except at the moment of binding. For this purpose, the bar which forms the transverse guide may be pivotally mounted and locked in its raised position. The control of the raising and lowering of the control wheel can then be ensured, for example, by means of the above-mentioned cord which serves for reversing the orientation of the control wheel at the end of its travel during its transverse movement, or else by other means which perform an equivalent function.

The description which will follow, made with reference to the illustrative preferred embodiments shown in the annexed drawings will enable the invention to be better understood.

DESCRIPTION OF THE PREFERRED EMBODIMENT

Figure 1:
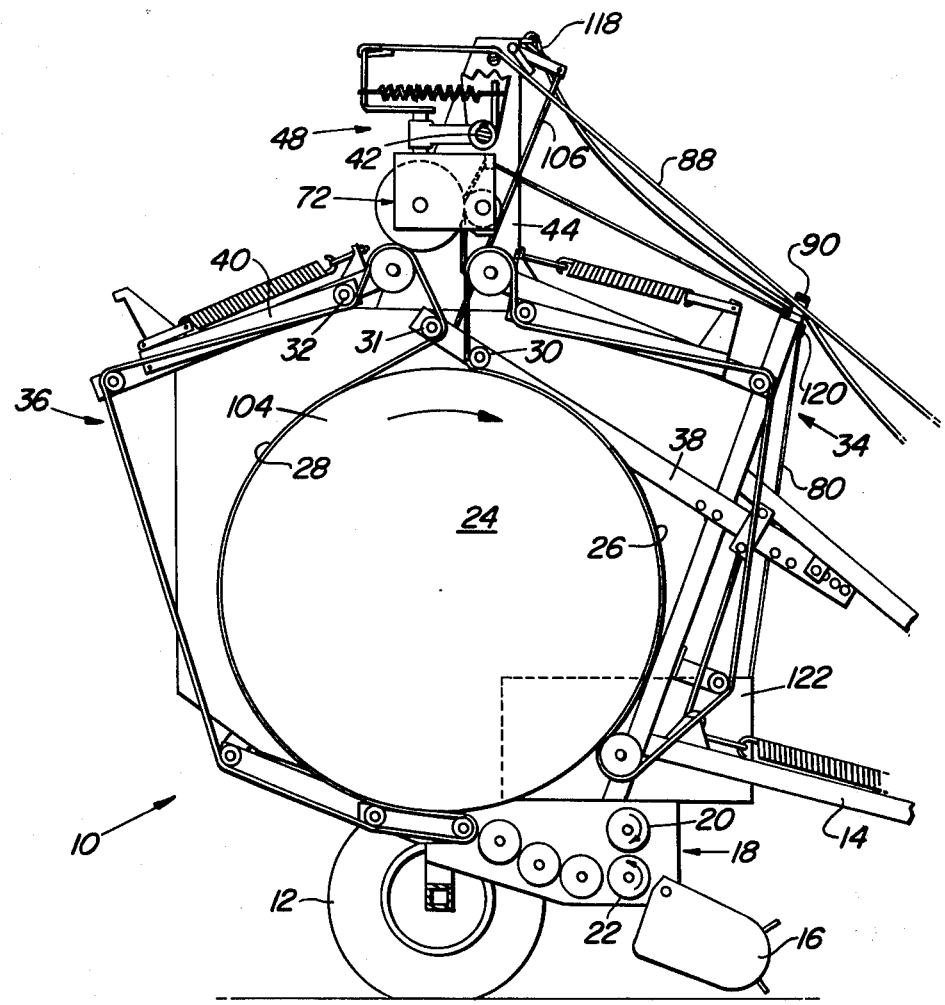
FIG. 1 is a right hand side view of a cylindrical bale-forming machine with its side sheet removed revealing internal components and provided with a binding device according to the invention.

In FIG. 1 there is shown a cylindrical-bale-forming baler of conventional type such as described in U.S. Pat. No. 4,121,513, the disclosure of which is hereby incorporated by reference herein. A body 10 of the baler is supported by a chassis provided with wheels 12,13. The baler is intended to be coupled to a tractor by means of a tongue structure 14. A crop pickup mechanism 16 is provided in a conventional manner on the front part of the body 10 of the baler, so as to collect the harvested products, such as forage, from the ground and to convey them to the entrance opening 18 provided between an upper compression roller 20, and a lower compression roller 22.

These products are subjected in an interior chamber 24, of the baler to a "rolling-up" (in direction of arrow) under the action of the bands or belts in order to form a cylindrical bale in a known manner.

There are usually provided in balers of this type, two separate sets of continuous belts 26,28, each set passing over an individual group of rollers 34,36, respectively. At least one roller of each of said groups is movable and is displaced in proportion to the increasing diameter of the bale during formation. As shown in FIG. 1, the references 30,31 and 32 indicate said movable rollers of each group of rollers which are journaled to spring tensioned pivotal arms 38,40, respectively.

As the baler per se is conventional, a further description of the operation of said baler is not deemed necessary and can be obtained by referring to U.S. Pat. No. 4,121,513 (the embodiment shown in FIGS. 1-7 thereof).

In accordance with a bale binding device of this invention, a transverse bar 42 is journaled between vertically extending support means 44. As can better be seen in FIG. 4, bar 42, provided along its length with a rib 46, receives a support 48. The support 48 comprises a first sleeve 50 fitted on the bar 42 and is displaceable on the latter by linear guide means with ball bearings for example (not shown). Sleeve 50 is provided with a keyway 52 which receives the rib 46 so that the said sleeve is angularly fixed with respect to the bar 42.

A second sleeve 54, perpendicularly extending and rigidly connected to the first sleeve 50 so as to form the support 48, has a vertical bore 56 in which a pivotal arm support means 58 is received. Support 58 serves for the mounting of a control wheel 60 and of a pressure wheel 62, preferably rubber. Wheel 62 constitutes herein a twine feeding means for holding twine 80 and responsive to rotation of wheel 60, for feeding twine 80 toward the bale-forming chamber. Control wheel 60 is provided with a means 94 for permitting rotation thereof only in the direction indicated by the arrow in FIG. 1, for a reason which will be set forth later. The pivotal shaft 64 of the support 58, carries at its lower end a cover 72 comprised of a "U" shaped member provided with downwardly extending legs 74 suitable for the journaling of the control wheel 60 and pressure wheel 62. Affixed to said shaft's upper end is a perpendicularly arranged arm 66. An "over center" tension spring 68 is connected between arm 66 and a vertically extending leg 70 integral with the first sleeve 50. The spring 68 causes the arm 66 to pivot, together with the cover 72, in vertical bore 56 of the second sleeve 54 from one side to another of a central position in which the spring 68 would be parallel to the arm 66.

Figure 6:
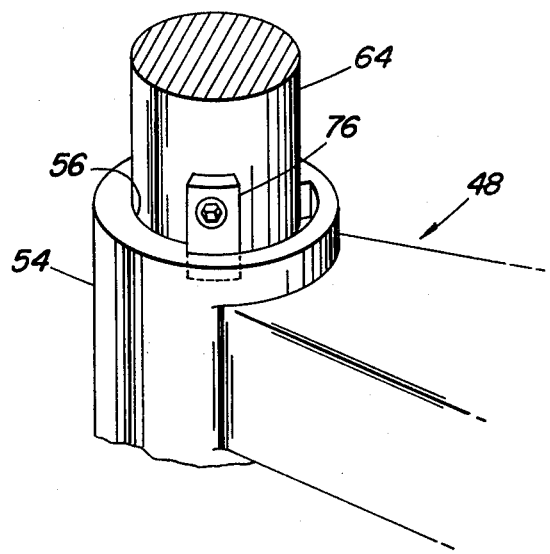
FIG. 6 is a perspective cutaway view of the binding device of FIG. 1 depicting the stop mechanism of the support.

The extent of pivotal movement as set forth above is limited by an adjustable stop 76 one of which can be seen in FIG. 6. The circumferential area of stop 76 may be varied to adjust the range of side-to-side motion, thus controlling the rate of transverse motion of the control wheel 22.

Figure 4:
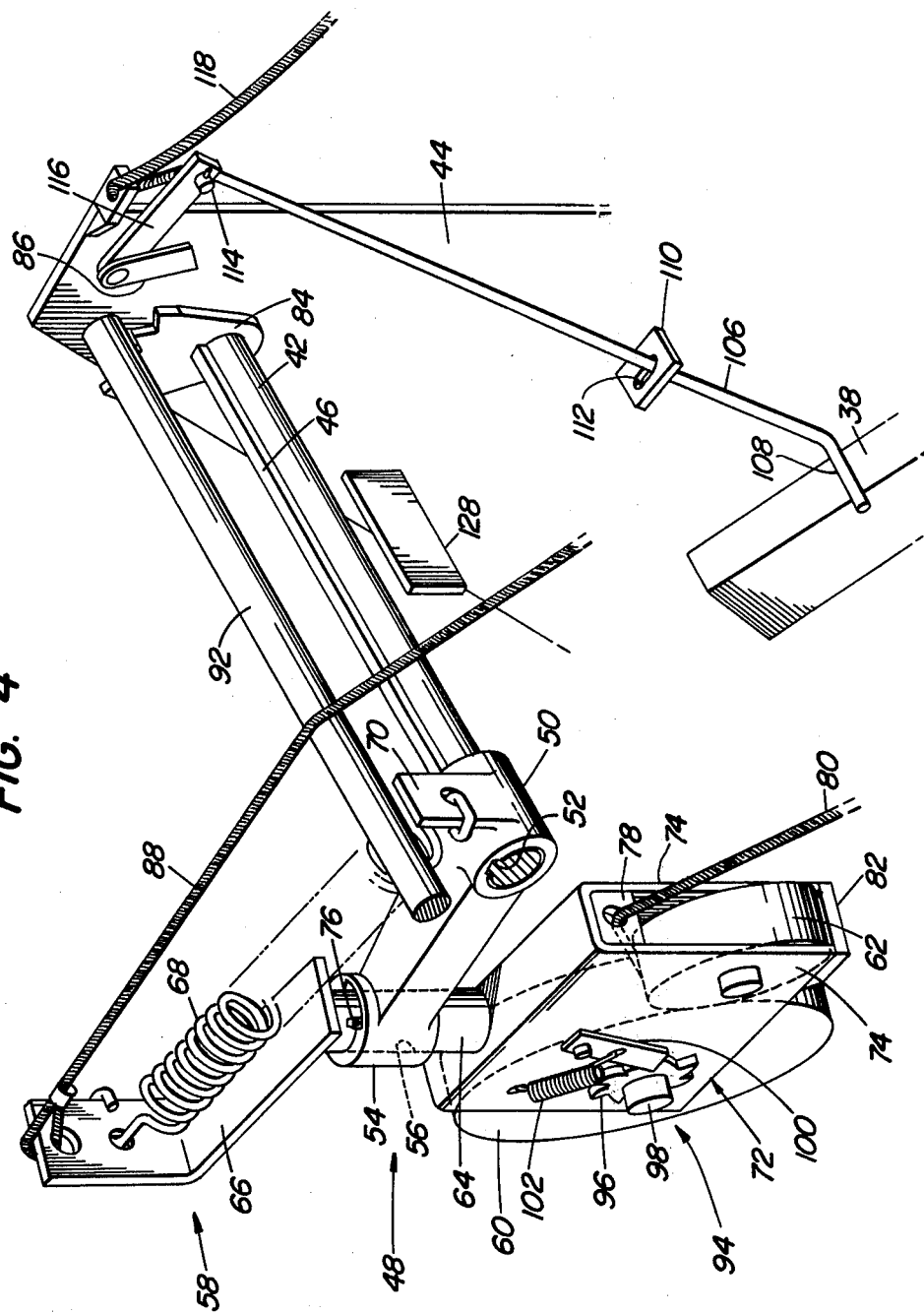
FIG. 4 is a fragmentary perspective view of the binding device of FIG. 1 depicting the guide forming bar and the associated control wheel, together with the locking device of said bar.

The cover 72 also carries a guiding eyelet 78 for the passage of the twine 80 as shown in FIG. 4, as well as a knife 82, the purpose of which will be indicated later.

Referring to FIG. 4, the bar 42 carries towards one end thereof a toothed sector 84 keyed angularly thereon and capable of cooperating with a pawl 86 when in a disengaged position.

Figure 5:
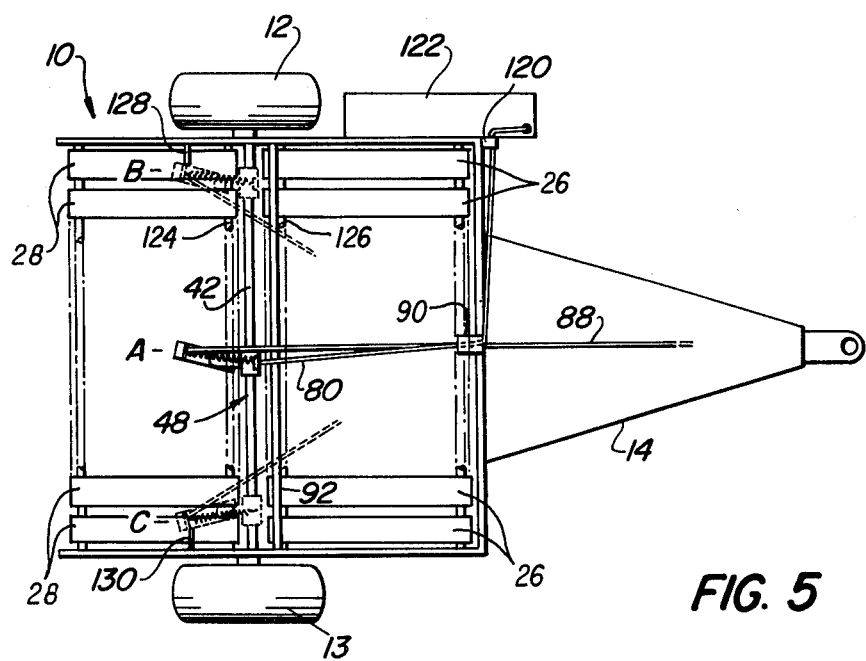
FIG. 5 is a diagrammatic top view of the binding device of FIG. 1 in outline showing the manner in which the twine enters the bale-forming chamber for the binding of the said bale.

A cord 88, the purpose of which will also be indicated later, is fastened to the arm 66. The cord passes over a transverse support 92 through a guide 90 located on the longitudinal axis of the baler as can be seen in FIGS. 1 and 5 and is connected to a point which is easily accessible to the operator of the tractor to which the baler is coupled.

The manner in which the binding device, according to the invention, operates will now be described.

Figure 3:
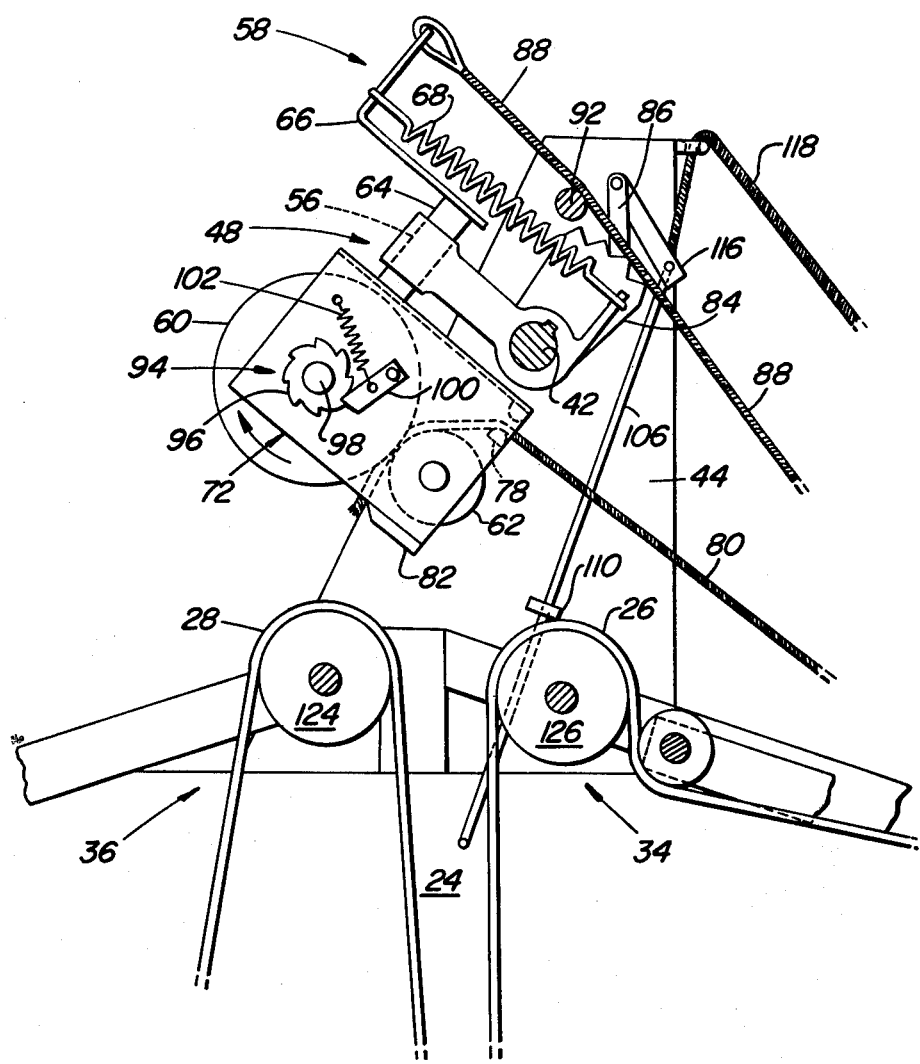
FIG. 3 is a view of the binding device similar to FIG. 2 except the device is shown in a disengaged position.

Referring to FIG. 3, at beginning of the operation, the support 48 carrying the control wheel 60 is located in the middle of the bar forming the transverse guide 42, the cover 72 being oriented in one direction together with the control wheel. Furthermore, the bar 42 is locked by the toothed sector 84 and the pawl 86 in an angular position such that the control wheel 60 is raised out of contact or in a disengaged position with the belts or bands 28. In this condition, the twine 80 is held by the control wheel 60 and the pulley 62, since said control wheel is provided with mechanism 94 for limiting rotation to one direction. Mechanism 94 consists of a ratchet 96 affixed to the control wheel shaft 98 and cooperating with a pawl 100 biased by a tension spring 102. The combination prevents rotation thereof in one direction, and thus prevents the twine 80 from escaping.

As the diameter of the bale increases, the pivotal arms 38,40 are displaced upwardly together. When the bale 104 attains its maximum diameter, the bar 42 is unlocked automatically by the action of the pivotal arm 38 striking upon a perpendicularly extending leg 108 (FIG. 4) on the lower portion of latch rod 106. Latch rod 106 is retained in place against the vertical support 44 by means of guide 110 provided with a slot 112. Located on the upper portion of rod 106 is an extending leg 114 (FIG. 4) which is received by an aperture in a bell crank arm 116. Arm 116 is rigidly affixed to pawl 86 about a common axis.

Figure 2:
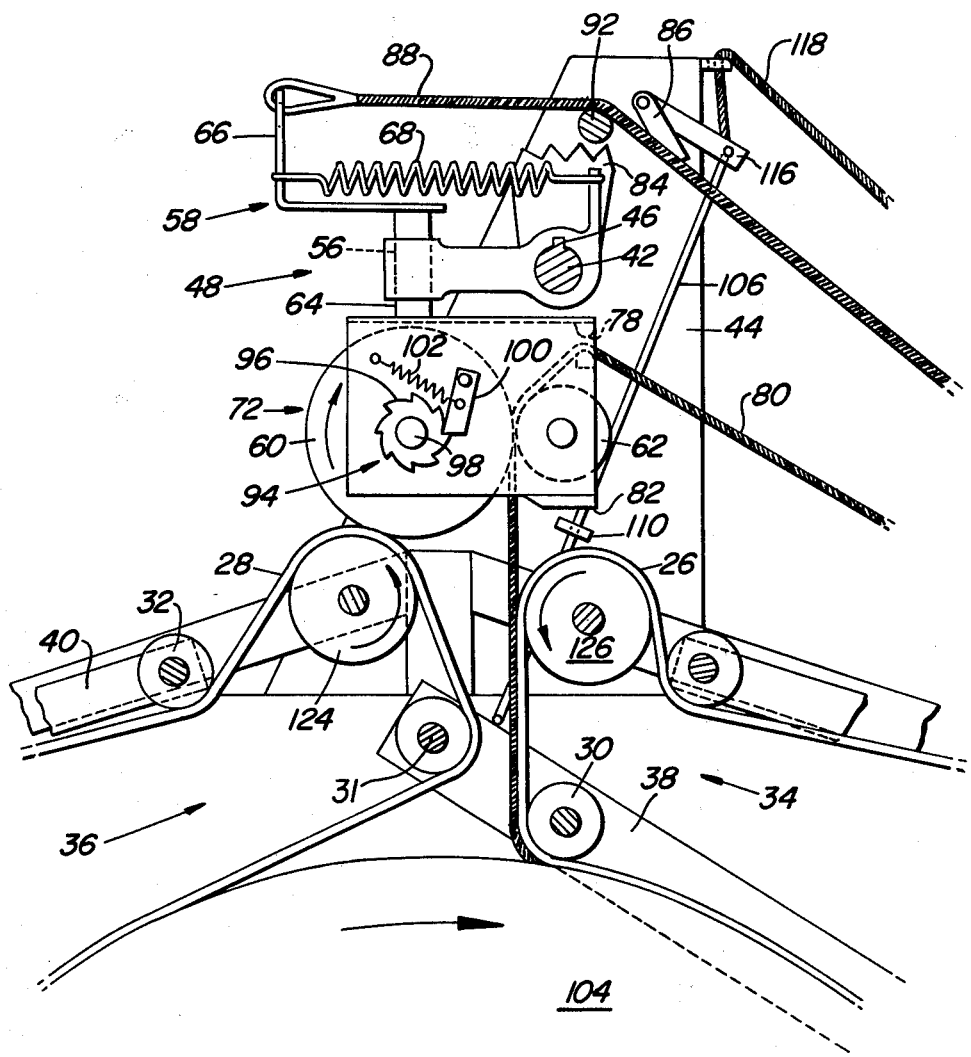
FIG. 2 is an enlarged detail view of the binding device of FIG. 1 shown in an engaged or operating position.

Alternatively, the unlocking of the aforesaid can be effected by the operator of the tractor by pulling cord 118. The toothed sector 84 is thus disengaged from the pawl 86 and, under the action of the weight of the support and of the parts associated therewith, the control wheel 60 is engaged against the belts 28, as shown in FIG. 2. Due to the movement of the belts 28, this control wheel is thus rotatably driven in the direction indicated by the arrow in FIG. 2. By cooperation with the pulley 62, wheel 60 applies tension to the twine 80 which, as can be seen in FIG. 5, passes between stationary guides 120 and 90 and which is withdrawn from a conventional twine box 122.

It can also be seen in FIG. 2 that, at the beginning of the operation the twine depends between the control wheel 60 and the pulley 62, so that, upon rotation of wheel 60, the end of this twine will come into contact with the bale 104 and is drawn completely around the bale for the binding thereof.

Due to the bias of spring 68, control wheel 60 and the cover 72 are inclined with respect to a plane at right angles to the bar 42 and thus to the longitudinal plane of the baler. As a result, contact of the wheel 60 with the belts 28 produces a force having a component parallel to guide 42. Thus, support 48, which is slidably mounted on guide 42, and wheel 60 are moved back and forth along the guide 42 responsive to the engagement of wheel 60 with driven belts 28. Support 48 (FIG. 5) is movable towards the left side of baler 10 when wheel 60 and cover 72 are inclined toward the left rear of baler 10 and toward the right side of baler 10 when wheel 60 and cover 72 are inclined toward the right rear of baler 10. The angle of inclination of control wheel 60 controls the rate of transverse displacement of wheel 60 along guide 42. Due to this transverse displacement, the portion of the twine passing between the upper rollers 124 and 126 (FIG. 2) is wound in helical turns around the bale.

In FIG. 5, the starting position of the support 48 and of the control wheel 60 is indicated at A and the position that they reach on one side of the baler at B.

When lateral position B is reached, a stop 128 may reverse the inclination of the cover 72 and hence of the wheel 60, or alternately this reversal may be effected by the driver of the tractor, by puling the cord 88. As a result of this reversal, the control wheel 60 is displaced transversely in the opposite direction with respect to the baler, taking with it the support 48 and the twine 80, until wheel 60 reaches the opposite position indicated at C in FIG. 5. In this position, another stop 130 or a further pull on the cord 88 reverses the angular position of the control wheel 60 which thus returns towards the middle of the baler.

The control of the reversal by the operator of the tractor by means of the cord 88 has the advantage that it enables the operator to select the number of turns made by the twine at the end part of the bale. Between these two positions, since the movement is controlled by the inclination of the control wheel, uniformly spaced turns of twine will be formed around the bale.

When the support 48 reaches the middle of the baler, the driver can, by applying a sufficiently strong pull on the cord 88, raise the control wheel 60 from the belts 28. Thereupon, as shown in FIG. 3, the knife 82, by the effect of the rocking movement of the support and of the cover, engages and cuts twine 80. The end of the twine is then held as before between the control wheel 60 and the pulley 62. After this rocking movement, the bar 42 pivots about its axis and the toothed sector 84 is engaged with pawl 86 which locks the control wheel in its raised position.

It will be recognized that modifications can be made in the embodiments described above, without deviating from the invention as defined in the appended claims.

I claim:

1. In a binding device for a baler comprising a plurality of rollers and two sets of flexible members supported on said rollers and defining a bale-forming chamber for rolling up harvested products into a cylindrical bale, the improvement comprising:
    a guide extending generally parallel to the longitudinal axis of said chamber;
    a rotatable control wheel;
    twine feeding means for holding said twine and responsive to the rotation of said control wheel, feeding twine toward a bale in said chamber;
    a support means for mounting said wheel, said feeding means and said guide on said baler (1) for movement of said wheel about an axis perpendicular to the longitudinal axis of said chamber (2) for movement of said wheel into and out of engagement with one of said sets and (3) for guiding said twine.

2. The device of claim 1, wherein said support means is slidably mounted on the guide.

3. The device of claim 2 wherein said support means includes a bracket slidably mounted on said guide and a wheel cover pivotably mounted on said bracket for movement about said perpendicular axis and rotatably mounting said wheel.

4. The device of claim 3, further comprising stop means for limiting and defining the angular position of the control wheel with respect to the longitudinal axis of the baler.

5. The device of claim 4, wherein said support means further comprises an over-center tension spring connected between said cover and said bracket for maintaining the control wheel alternatively in each of two positions about said perpendicular axis.

6. The device of any one of claims 1–4 or 5 further comprising means for reversing the orientation of the control wheel about said perpendicular axis when the control wheel reaches the end of its travel adjacent one end of said chamber.

7. The device of claim 6, further comprising a rope connected to said support means for reversing the orientation of said wheel about said perpendicular axis and for disengaging said wheel from said one set of members.

8. The device of any one of claims 1–4 or 5:
    wherein said feeding means comprises a pressure wheel for pressing said twine against said control wheel and
    further comprising means for permitting rotation of said control wheel only in a direction corresponding to the entry of twine into said chamber.

9. The device of any one of claims 1–4 or 5 further comprising means for locking said control wheel in a position out of contact with said one set of members.

10. The device of claim 9, wherein said guide has a noncircular cross section and is mounted on said baler to pivot about its axis, and said locking means locks said guide in a position corresponding to the position of the control wheel when disengaged from said one set of members.

11. The device of claim 10 further comprising a knife mounted on said support means for engaging and severing said twine when said control wheel is disengaged from said one set of members.

* * * * *